(12) United States Patent
Yamawaki

(10) Patent No.: US 8,130,254 B2
(45) Date of Patent: Mar. 6, 2012

(54) OPTICAL SCANNING APPARATUS AND COLOR IMAGE FORMING APPARATUS USING THE SAME

(75) Inventor: Takeshi Yamawaki, Tokyo (JP)

(73) Assignee: Canon Kabushiki Kaisha (JP)

( * ) Notice: Subject to any disclaimer, the term of this patent is extended or adjusted under 35 U.S.C. 154(b) by 108 days.

(21) Appl. No.: 12/785,450

(22) Filed: May 22, 2010

(65) Prior Publication Data

US 2010/0295918 A1    Nov. 25, 2010

(30) Foreign Application Priority Data

May 22, 2009 (JP) ................................ 2009-123924

(51) Int. Cl.
*B41J 15/14* (2006.01)
*B41J 27/00* (2006.01)
(52) U.S. Cl. ........................................ 347/244; 347/258
(58) Field of Classification Search .................. 347/230, 347/241–244, 256–261
See application file for complete search history.

(56) References Cited

U.S. PATENT DOCUMENTS

| 7,072,087 B2 * | 7/2006 | Nakahata | 359/204.1 |
| 7,538,924 B2 * | 5/2009 | Tomita | 359/204.1 |
| 7,791,632 B2 * | 9/2010 | Igarashi | 347/241 |
| 2008/0298839 A1 * | 12/2008 | Tomioka | 399/151 |

FOREIGN PATENT DOCUMENTS

| JP | 9-197309 A | 7/1997 |
| JP | 9-197315 A | 7/1997 |
| JP | 10-148781 A | 6/1998 |

* cited by examiner

*Primary Examiner* — Hai C Pham
(74) *Attorney, Agent, or Firm* — Rossi, Kimms & McDowell LLP

(57) ABSTRACT

The optical scanning apparatus has at least two scanning units S1 and S2 which are arranged so as to oppose each other with a deflecting unit interposed therebetween. The scanning units include incident optical systems La and Lb that guide light beams emitted from light source units 1a and 1b to the deflecting unit 4, and imaging optical systems Ma and Mb that cause the light beams for scanning deflected on a deflecting surface of the deflecting unit to form images on surfaces 8a and 8b to be scanned. The two scanning units are configured such that the main scanning planes thereof including an optical reference axis C0 have different heights from a bottom surface 4c of the deflecting unit in the direction of the rotational axis of the deflecting unit.

6 Claims, 4 Drawing Sheets

OPTICAL SCANNING APPARATUS AND COLOR IMAGE FORMING APPARATUS USING THE SAME

BACKGROUND OF THE INVENTION

1. Field of the Invention

The present invention relates to an optical scanning apparatus and a color image forming apparatus using the same. The present invention is suitable for use in a color image forming apparatus such as a laser beam printer, a digital copying machine, or a multi-function printer, which adopts an electrophotographic process.

2. Description of the Related Art

Hitherto, an optical scanning apparatus has been used in an image forming apparatus such as a digital copying machine or a laser beam printer (LBP). In the optical scanning apparatus of this type, opposed scanning units in which a plurality of scanning units is arranged so as to oppose each other with an optical deflector interposed therebetween are used as a means for downsizing the entire apparatus. The optical scanning apparatus using the opposed scanning units performs scanning with a plurality of light beams by means of the same optical deflector and guides the light beams to different surfaces to be scanned by means of imaging optical systems arranged on both sides of the optical deflector. Various optical scanning apparatuses using such a method have conventionally been proposed (refer to Japanese Patent Application Laid-Open Nos. H10-148781, H09-197309, and H09-197315).

Japanese Patent Application Laid-Open No. H10-148781 describes an optical scanning apparatus in which a common optical deflector causes light beams emitted from two light source units to be deflected and reflected from different deflecting surfaces, and two imaging optical systems provided so as to oppose each other with the optical deflector interposed therebetween cause the deflected light beams to form spot images on different surfaces to be scanned, thus performing image formation.

A problem with such an arrangement that the optical axes of the imaging optical systems are approximately parallel to each other with the optical deflector interposed therebetween is that undesirable light generated by one imaging optical system passes over the optical deflector to enter the other imaging optical system and reaches the surface to be scanned, thus causing image-quality deterioration. The undesirable light is stray light and ghost.

As illustrated in FIG. 3B of Japanese Patent Application Laid-Open No. H10-148781, the undesirable light is generated from a region arranged slightly outside the diameter of an inscribed circle of the optical deflector. In Japanese Patent Application Laid-Open No. H10-148781, as a countermeasure against undesirable light, a part of a housing member of the optical deflector is formed as a light blocking wall.

As illustrated in FIG. 1 of Japanese Patent Application Laid-Open No. H10-148781, an additional light blocking member (light blocking plate) is provided in a region that is not covered by the housing member. The housing member of Japanese Patent Application Laid-Open No. H10-148781 is a cover of a polygon mirror which is provided for the purpose of dirt prevention and wind noise reduction in a rotational polygon mirror used as the optical deflector. As another countermeasure against undesirable light, Japanese Patent Application Laid-Open No. H09-197309 discusses an optical scanning apparatus which has a common optical deflector configured to cause light beams to be obliquely incident on deflecting surfaces from a sub-scanning direction so that incident optical systems arranged so as to oppose each other with the optical deflector interposed therebetween have different oblique incidence angles. According to this configuration, since undesirable light reflected from one imaging optical system reaches the other imaging optical system arranged on the opposite side of the optical deflector at different height and angle, the undesirable light will not pass through the imaging optical system to reach the surface to be scanned. Although Japanese Patent Application Laid-Open No. H09-197309 describes an overfilled optical system as an example, the same advantage is obtained in an underfilled optical system.

In Japanese Patent Application Laid-Open No. H09-197135, as a countermeasure against undesirable light in the overfilled optical system, two light blocking members are arranged outside a circumscribed circle of the overfilled optical system. The distance between opposing ends of both light blocking members is set to be smaller than the diameter of an inscribed circle thereof.

As described in Japanese Patent Application Laid-Open No. H09-197315, the light blocking members for blocking undesirable light are arranged outside the circumscribed circle of the rotational polygon mirror, and a line connecting the opposing ends of the light blocking members extends so as to intersect the diameter of the inscribed circle of the rotational polygon mirror. However, in the vicinity of the deflecting surface, light beams entering from a light source unit or scanning light beams reflected from the optical deflector appear. For this reason, there is a problem in that it is difficult to dispose the light blocking members so as to completely block the undesirable light while not interfering with these light beams. Moreover, in order to detect the writing position of a scanning optical system, a writing position detecting optical system (BD optical system) is typically arranged close to the incident optical systems. For this reason, there is another problem in that the angle between the incident optical systems that make light beams incident on the deflecting surfaces increases, and the space for arranging the light blocking members decreases, thus making the arrangement further difficult.

SUMMARY OF THE INVENTION

The present invention provides an optical scanning apparatus capable of making the arrangement of a light blocking unit easy and easily blocking undesirable light generated in a scanning unit with the light blocking unit. The present invention also provides a color image forming apparatus using the optical scanning apparatus.

According to one aspect of the invention, an optical scanning apparatus includes two scanning units, the two scanning units each including: a light source unit; an incident optical system that guides light beams emitted from the light source unit to a deflecting unit; and an imaging optical system that causes the light beams deflected for scanning by a deflecting surface of the deflecting unit to form an image on a surface to be scanned, wherein: in a sub-scanning section, the two scanning units are arranged so as to oppose each other with the deflecting unit interposed therebetween; in the sub-scanning section, the two scanning units are configured such that main scanning planes thereof including an optical reference axis have different height from a bottom surface of the deflecting unit in the direction of a rotational axis of the deflecting unit; the two scanning units each include a light blocking unit that prevents undesirable light generated by the other scanning unit from entering the corresponding scanning unit; of at least one imaging optical element constituting the imaging optical system, an imaging optical element disposed optically closest to the deflecting unit is arranged such that an optical axis of the imaging optical element is made eccentric in the sub-scanning section so that undesirable light generated by the other scanning unit is caused to travel away from the main scanning plane including the optical reference axis of the corresponding scanning unit.

According to another aspect of the invention, an optical scanning apparatus includes two scanning units, the two scanning units each including: a light source unit; an incident optical system that guides light beams emitted from the light source unit to a deflecting unit; and an imaging optical system that causes the light beams deflected for scanning by a deflecting surface of the deflecting unit to form an image on a surface to be scanned, wherein: in a sub-scanning section, the two scanning units are arranged so as to oppose each other with the deflecting unit interposed therebetween; in the sub-scanning section, the two scanning units are configured such that main scanning planes thereof including an optical reference axis have a different height from a bottom surface of the deflecting unit in the direction of a rotational axis of the deflecting unit; the two scanning units each include a light blocking unit that prevents undesirable light generated by the other scanning unit from entering the corresponding scanning unit; of at least one imaging optical element constituting the imaging optical system, an imaging optical element having the greatest power in the sub-scanning direction is arranged such that the imaging optical element is made eccentric in the sub-scanning section so that undesirable light generated by the other scanning unit is caused to travel away from the main scanning plane including the optical reference axis of the corresponding scanning unit.

According to a further aspect of the invention, in the optical scanning apparatus, the two scanning units are configured such that in the sub-scanning section, the respective main scanning planes including the optical reference axis are parallel to each other with the deflecting unit interposed therebetween.

According to another aspect of the invention, a color image forming apparatus includes a plurality of image bearing members which are arranged on a surface to be scanned of the optical scanning apparatus set out in the foregoing so as to form images of different colors.

According to the aspects of the present invention, it is possible to provide an optical scanning apparatus capable of making the arrangement of a light blocking unit easy and easily blocking undesirable light generated in a scanning unit with the light blocking unit and a color image forming apparatus using the optical scanning apparatus.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An optical scanning apparatus of the present invention has at least two scanning units arranged so as to oppose each other with a deflecting unit interposed therebetween, and each of the scanning units includes a light source unit, an incident optical system that guides light beams emitted from the light source unit to the deflecting unit, and an imaging optical system that causes the light beams for scanning deflected on a deflecting surface of the deflecting unit to form images on a surface to be scanned. The two scanning units are configured such that the main scanning planes including an optical reference axis have different heights from the bottom surface of the deflecting unit in the direction of the rotational axis of the deflecting unit. Preferred embodiments of the present invention will now be described in detail in accordance with the accompanying drawings.

Embodiment 1

Figure 1A:
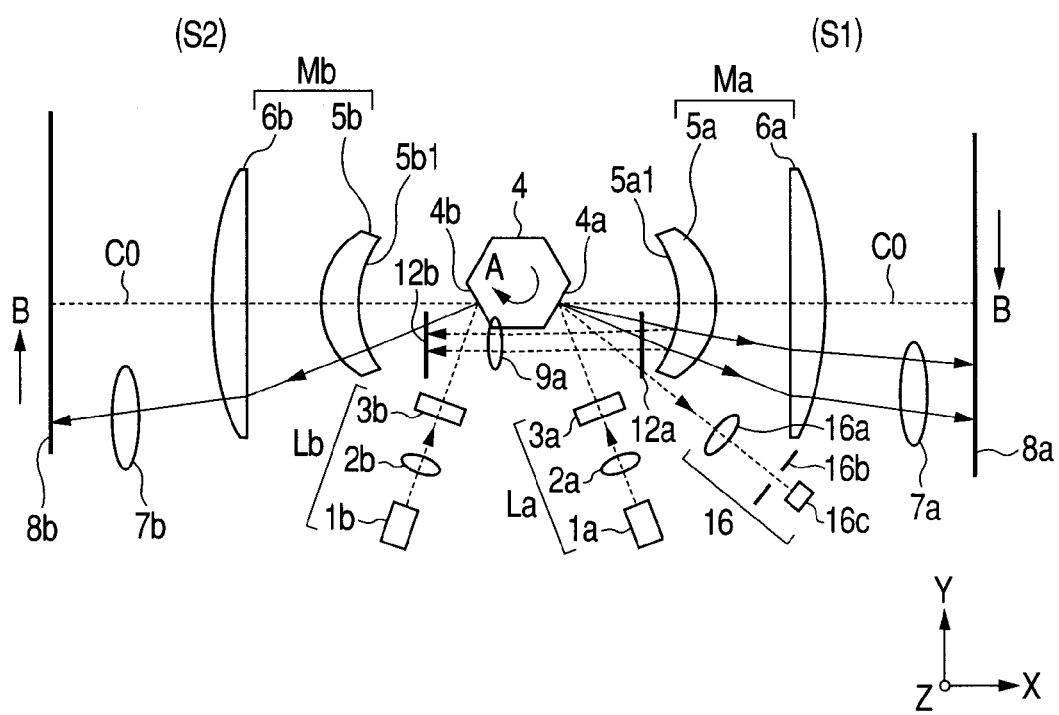
FIG. 1A is a main-scanning sectional diagram of an optical scanning apparatus according to Embodiment 1 of the present invention.
Figure 1B:
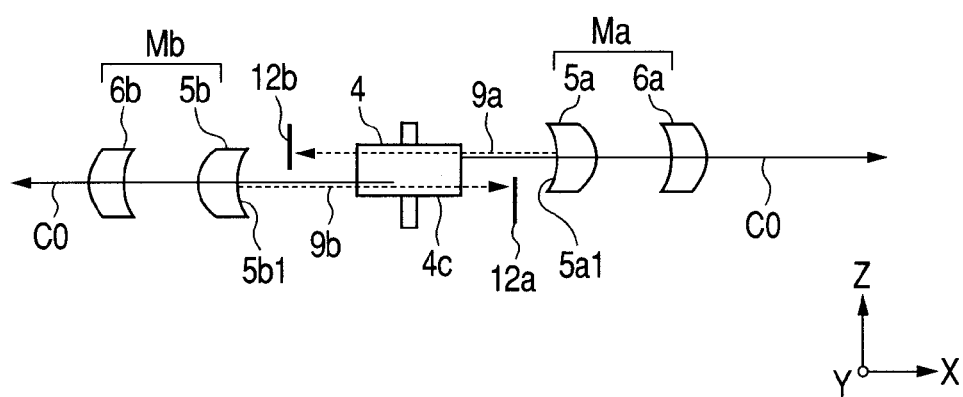
FIG. 1B is a sub-scanning sectional diagram of the optical scanning apparatus according to Embodiment 1 of the present invention.

FIGS. 1A and 1B are sectional diagrams of a main portion of an optical scanning apparatus according to Embodiment 1 of the present invention. Specifically, FIG. 1A is a sectional diagram (main-scanning sectional diagram) of the main portion in a main scanning direction, and FIG. 1B is a sectional diagram (sub-scanning sectional diagram) of the main portion in a sub-scanning direction according to Embodiment 1 of the present invention.

In the description below, the sub-scanning direction (Z direction) is a direction parallel to a rotational axis of a deflecting unit. A main scanning plane (main scanning section) is a section whose normal direction is the sub-scanning direction (direction parallel to the rotational axis of the deflecting unit). The main scanning direction (Y direction) is a direction where light beams deflected for scanning by the deflecting unit are projected on the main scanning section. A sub-scanning section is a section whose normal direction is the main scanning direction.

An optical scanning apparatus according to the present embodiment is a tandem type optical scanning apparatus (color image forming apparatus) which includes two imaging optical systems (fθ lens systems) Ma and Mb arranged so as to oppose each other with an optical deflector (polygon mirror) 4 as a deflecting unit interposed therebetween. The optical scanning apparatus causes two light beams to be incident on the respective imaging optical systems Ma and Mb so that the two light beams are simultaneously deflected and reflected by one optical deflector 4. The two light beams are respectively guided to corresponding photosensitive drum surfaces 8a and 8b as surfaces to be scanned to scan optically the photosensitive drum surfaces 8a and 8b.

In the drawings, reference numerals S1 and S2 are first and second scanning units (opposed scanning optical systems), respectively. Hereinafter, when describing the components of the first and second scanning units S1 and S2, those of the first scanning unit S1 will be mainly described. Furthermore, components of the second scanning unit S2 similar to those of the first scanning unit S1 will be bracketed.

The first (second) scanning unit S1 (S2) includes a first optical element 2a (2b) that transforms the state of light beams emitted from a light source unit 1a (1b) to a different state of the light beam, and a second optical element 3a (3b) that causes the light beams to form a linear image that is long in the main scanning direction. The first (second) scanning unit S1 (S2) further includes the optical deflector 4 as the deflecting unit and the imaging optical system Ma (Mb) that causes the light beams deflected and reflected by the optical deflector 4 to form a spot image on the photosensitive drum surface 8a (8b) as the surface to be scanned.

In the present embodiment, the first and second scanning units S1 and S2 share the same optical deflector 4. In the present embodiment, the timing when the first and second scanning units S1 and S2 start writing on the respective surfaces to be scanned 8a and 8b is detected by one writing position detecting unit 16 (BD optical system) by using the light beams deflected by a deflecting surface 4a of the optical deflector 4. The writing timings on the photosensitive drum surfaces 8a and 8b are determined using signals detected by the writing position detecting unit 16. The writing position detecting unit 16 includes an imaging lens 16a for synchronization detection, a slit 16b, and a light-receiving sensor 16c.

In the first and second scanning units S1 and S2, the light source units 1a and 1b are each configured by a semiconductor laser that has a single light-emitting point (light-emitting portion). Although in the present embodiment, the light source units 1a and 1b are each configured by a semiconductor laser having a single light-emitting point, the present invention is not limited to this, and the light source unit may be configured by a multi-semiconductor laser having a plurality of light-emitting points.

The first optical elements 2a and 2b are each configured by a collimator lens, and each is configured to transform the light beams emitted from the light source units 1a and 1b into parallel light beams (alternatively, diverged or converged light beams). The second optical elements 3a and 3b are each configured by a cylindrical lens and each has a refractive power only within the sub-scanning section (in the sub-scanning direction).

The collimator lens 2a (2b) and the cylindrical lens 3a (3b) may be configured by one optical element (anamorphic lens). Moreover, respective elements of the collimator lens 2a (2b) and the cylindrical lens 3a (3b) constitute one element of an incident optical system La (Lb).

The optical deflector 4 is configured by a rotational polygon mirror (polygon mirror) having six deflecting surfaces, and is rotated at a constant speed in the direction of an arrow A in the drawing by a driving unit (not illustrated) such as a motor. In the present embodiment, the first and second scanning units S1 and S2 share the optical deflector 4 as described above. The first and second scanning units S1 and S2 use the light beams deflected and reflected by different deflecting surfaces 4a and 4b of the optical deflector 4.

The imaging optical system (fθ lens system) Ma (Mb) has a condensing function and an fθ characteristic and is configured by first and second imaging lenses 5a and 6a (5b and 6b). The imaging optical system Ma (Mb) is configured to cause the light beams deflected and reflected by the optical deflector 4 to form a spot image on the corresponding surface to be scanned 8a (8b). Furthermore, the imaging optical system Ma (Mb) is configured to provide an optical face tangle error correction function by causing the deflecting surface 4a (4b) of the optical deflector 4 and the surface to be scanned 8a (8b) to satisfy a conjugate relationship in the sub-scanning section. Reference numeral 7a (7b) is scanning light beams of the first (second) scanning unit S1 (S2).

Reference numeral C0 is an optical reference axis. Here, the optical reference axis C0 is an axis that is vertical to the deflecting surface and passes through an incident point on the deflecting surface, of the principal ray of light beams in the sub-scanning section when the principal ray of the light beams emitted from an incident optical system is deflected for scanning on the deflecting surface of an optical deflector to enter the center of a surface to be scanned. A light blocking member (light blocking plate) 12a (12b) as a light blocking unit is arranged outside the diameter of a circumscribed circle of the optical deflector 4 and between the optical deflector 4 and the first imaging lens 5a (5b). The light blocking member 12a (12b) is configured to prevent an undesirable light 9b (9a) generated by the other scanning unit S2 (S1) from entering the corresponding scanning unit S1 (S2).

In the present invention, the collimator lens 2a (2b) transforms the light beams, which are optically modulated based on the image information and emitted from the light source unit 1a (1b), into parallel or converged light beams according to image information, and the transformed light beams are incident on the cylindrical lens 3a (3b). The light beams incident on the cylindrical lens 3a (3b) pass therethrough with their state unchanged in the main scanning section. Moreover, the light beams incident on the cylindrical lens 3a (3b) are converged in the sub-scanning section to form a linear image (which is long in the main scanning direction) on the deflecting surface 4a (4b) of the optical deflector 4. Then, the imaging optical system Ma (Mb) causes the light beams deflected and reflected by the deflecting surface 4a (4b) of the optical deflector 4 to form a spot image on the photosensitive drum surface 8a (8b). When the optical deflector 4 is rotated in the direction of the arrow A, the photosensitive drum surface 8a (8b) is optically scanned at a constant speed in the direction (main scanning direction) of the arrow B. In this way, images are recorded on the photosensitive drum surface 8a (8b) which is a recording medium.

In the related art, an optical scanning apparatus in which two scanning units are arranged so as to oppose each other with an optical deflector interposed therebetween had a problem in that undesirable light generated from one scanning unit passes over the optical deflector to enter the other scanning unit and reaches the surface to be scanned, thus causing image-quality deterioration. In the related art described above, light blocking members were arranged in the vicinity of the deflecting surface of the optical deflector (inside the diameter of the inscribed circle of the optical deflector) so as to block the undesirable light. However, in the vicinity of the deflecting surface of the optical deflector, light beams entering from an incident optical system or light beams deflected by the optical deflector appear. For this reason, there was a problem in that when the light blocking members was arranged so as not to interfere with these light beams, the space was narrow and the arrangement was difficult. Therefore, it was difficult to block the undesirable light completely in the related art.

Therefore, in the present embodiment, the main scanning planes including the optical reference axis C0 of the first and second scanning units S1 and S2 are configured to be at a different height from a bottom surface 4c of the optical deflector 4 in the direction (sub-scanning direction) of the rotational axis of the optical deflector 4. That is to say, as illustrated in FIG. 1B, the respective main scanning planes including the optical reference axis C0 are configured to have a predetermined gap in the sub-scanning direction with the optical deflector 4 interposed therebetween. Moreover, the respective main scanning planes including the optical reference axis C0 are configured to be parallel to each other with the optical deflector 4 interposed therebetween.

With this configuration, in the present invention, the arrangement space of the light blocking members 12b (12a) is increased, thus making the arrangement of the light blocking members 12b (12a) easy. Therefore, for example, even when the undesirable light 9a (9b) is reflected from a surface 5a1 (5b1) of the first imaging lens 5a (5b) to pass horizontally the optical deflector 4 and travel towards the imaging optical system Mb (Ma), the undesirable light 9a (9b) can be easily blocked by the light blocking members 12b (12a) arranged in the scanning unit S2 (S1).

In this way, in the present embodiment, by configuring the optical scanning apparatus as described above, undesirable light from an opposed scanning unit can be easily blocked by the light blocking unit. Therefore, in the present embodiment, high-quality images can be obtained with a simple configuration.

Although in the present embodiment the imaging optical system is configured by two lenses, the present invention is not limited to this, the imaging optical system may be configured by one lens or three or more lenses. Moreover, although there may be at least two scanning units, the number is not limited to two, but plural (two or more) scanning units may be arranged so as to oppose each other with the common optical deflector 4 interposed therebetween.

Embodiment 2

Figure 2A:
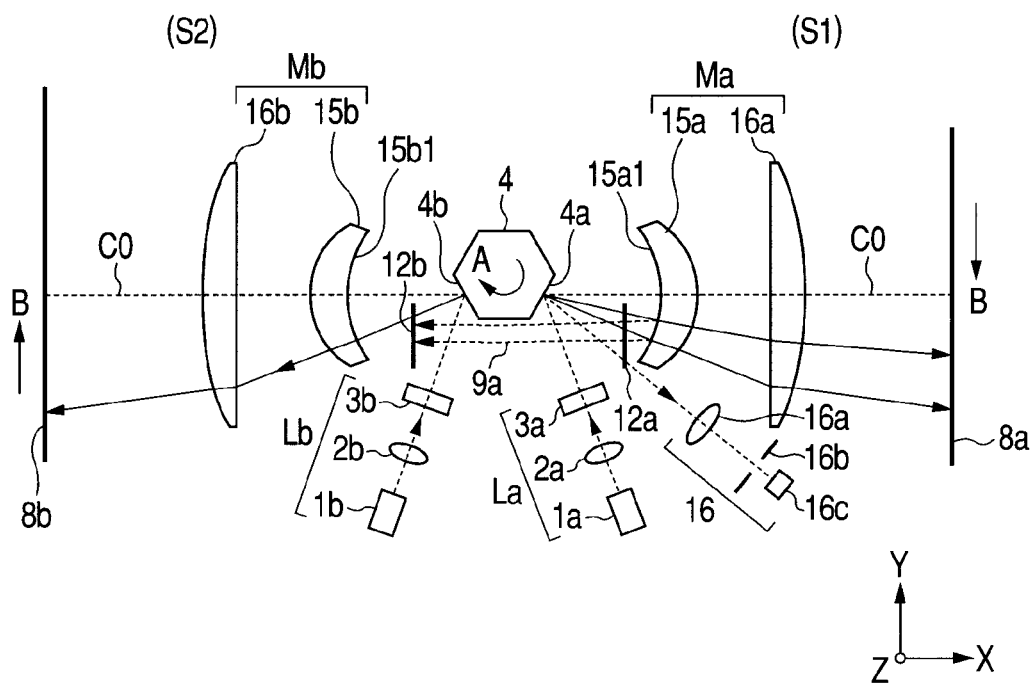
FIG. 2A is a main-scanning sectional diagram of an optical scanning apparatus according to Embodiment 2 of the present invention.
Figure 2B:
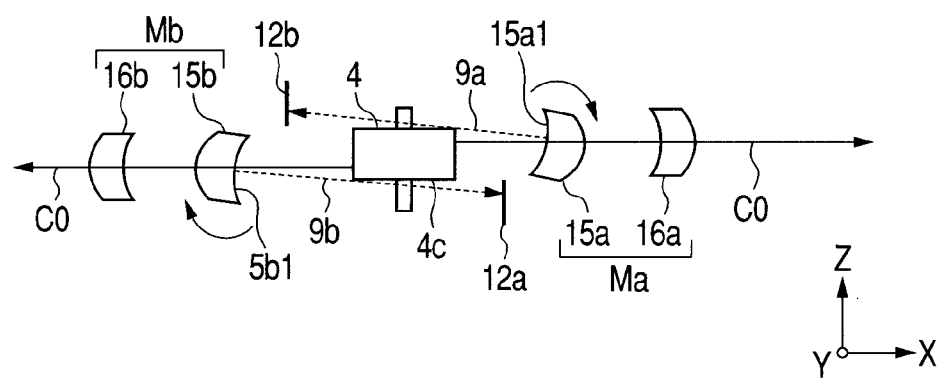
FIG. 2B is a sub-scanning sectional diagram of the optical scanning apparatus according to Embodiment 2 of the present invention.

FIGS. 2A and 2B are sectional diagrams of a main portion of an optical scanning apparatus according to Embodiment 2 of the present invention. Specifically, FIG. 2A is a sectional diagram (main-scanning sectional diagram) of the main portion in the main scanning direction, and FIG. 2B is a sectional diagram (sub-scanning sectional diagram) of the main portion in the sub-scanning direction. In FIGS. 2A and 2B, the same elements as the elements illustrated in FIGS. 1A and 1B will be denoted by the same reference numerals.

The present embodiment is different from Embodiment 1 described above in that at least one among imaging optical elements (imaging lenses) of the imaging optical system Ma (Mb), is an imaging lens having the greatest power in the sub-scanning direction and which is made eccentric. Other configurations and optical functions are the same as in Embodiment 1, and thus the same advantages can be obtained.

An imaging optical system (fθ lens system) Ma (Mb) has a condensing function and an fθ characteristic and is configured by first and second imaging lenses 15a and 16a (15b and 16b). The imaging optical system Ma (Mb) is configured to cause a plurality of light beams deflected and reflected by the optical deflector 4 to form a spot image on the corresponding surface to be scanned 8a (8b). Furthermore, the imaging optical system Ma (Mb) is configured to provide an optical face tangle error correction function by causing the deflecting surface 4a (4b) of the optical deflector 4 and the surface to be scanned 8a (8b) to satisfy a conjugate relationship in the sub-scanning section.

In the present invention, among the first and second imaging lenses 15a and 16a (15b and 16b) of the imaging optical system Ma (Mb), the first imaging lens 15a (15b) having the greatest power in the sub-scanning direction is arranged as follows. That is to say, the first imaging lens 15a (15b) is made eccentric (tilted) in the sub-scanning section so that the undesirable light 9a (9b) generated by the scanning unit S1 (S2) travels away from the main scanning plane including the optical reference axis C0 of the other scanning unit S2 (S1). With this configuration, in the present embodiment, the undesirable light 9a (9b) which is generated by being reflected from a surface 15a1 (15b1) of the first imaging lens 15a (15b) is caused to travel in the direction away (distant) from the main scanning plane including the optical reference axis C0 of the opposed scanning unit S2 (S1). In this way, the undesirable light 9a (9b) generated by the first imaging lens 15a (15b) can be easily blocked by the light blocking members 12b (12a) provided in the second (first) scanning unit S2 (S1).

In this way, in the present embodiment, by tilting the first imaging lens in the sub-scanning section as described above, undesirable light from an opposed scanning unit can be easily blocked by the light blocking unit. Therefore, in the present embodiment, the undesirable light can be blocked more easily than in Embodiment 1 described above.

Embodiment 3

Figure 3A:
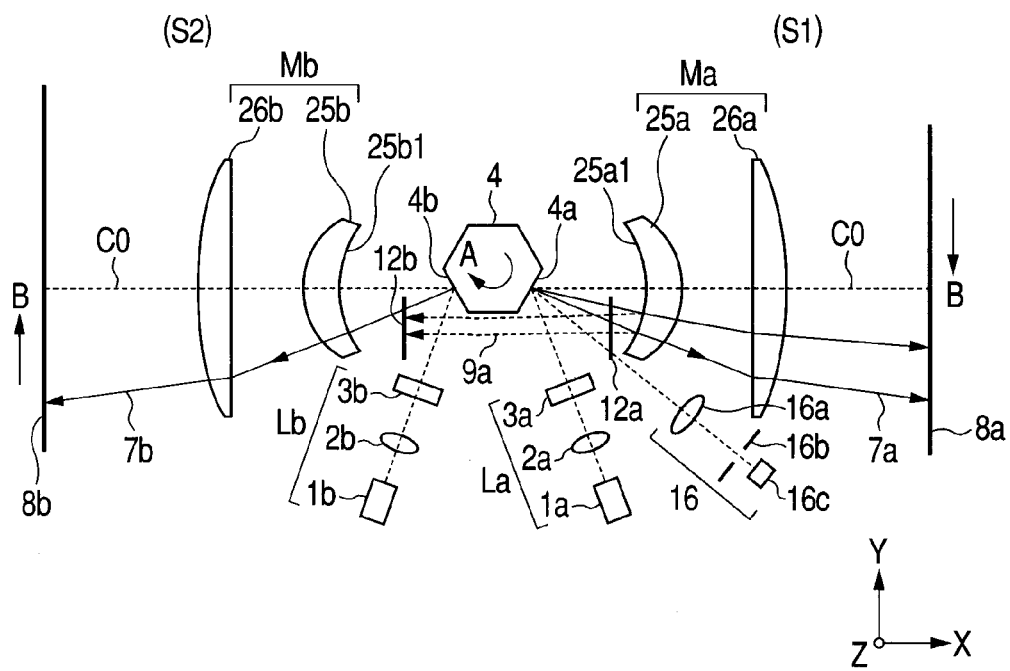
FIG. 3A is a main-scanning sectional diagram of an optical scanning apparatus according to Embodiment 3 of the present invention.
Figure 3B:
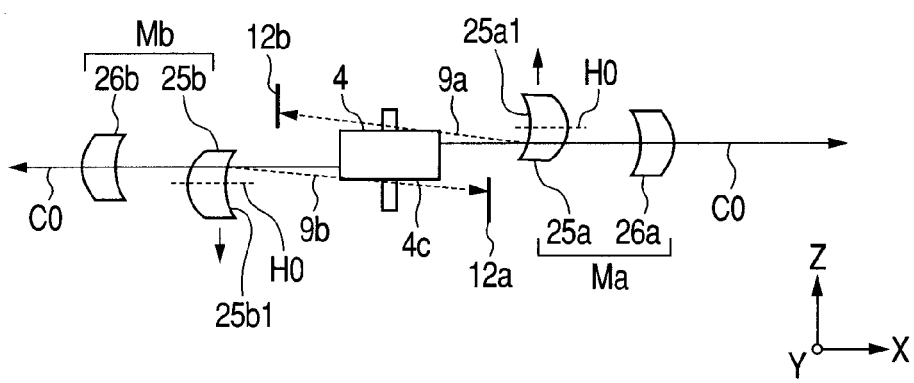
FIG. 3B is a sub-scanning sectional diagram of the optical scanning apparatus according to Embodiment 3 of the present invention.

FIGS. 3A and 3B are sectional diagrams of a main portion of an optical scanning apparatus according to Embodiment 3 of the present invention. Specifically, FIG. 3A is a sectional diagram (main-scanning sectional diagram) of the main portion in the main scanning direction, and FIG. 3B is a sectional diagram (sub-scanning sectional diagram) of the main portion in the sub-scanning direction. In FIGS. 3A and 3B, the same elements as the elements illustrated in FIGS. 1A and 1B will be denoted by the same reference numerals.

The present embodiment is different from Embodiment 1 described above in that an imaging lens that is optically the closest to the optical deflector 4 is made eccentric. Other configurations and optical functions are the same as in Embodiment 1, and thus the same advantages can be obtained.

An imaging optical system (fθ lens system) Ma (Mb) has a condensing function and an fθ characteristic and is configured by first and second imaging lenses 25a and 26a (25b and 26b). The imaging optical system Ma (Mb) is configured to cause a plurality of light beams deflected and reflected by the optical deflector 4 to form a spot image on the corresponding surface to be scanned 8a (8b). Furthermore, the imaging optical system Ma (Mb) is configured to provide an optical face tangle error correction function by causing the deflecting surface 4a (4b) of the optical deflector 4 and the surface to be scanned 8a (8b) to satisfy a conjugate relationship in the sub-scanning section.

In the present invention, among the first and second imaging lenses 25a and 26a (25b and 26b) of the imaging optical system Ma (Mb), an optical axis H0 of the first imaging lens 25a (25b) that is optically the closest to the optical deflector 4 is arranged as follows. That is to say, the optical axis H0 of the first imaging lens 25a (25b) is made eccentric (shifted) in the sub-scanning section so that the undesirable light 9a (9b) generated by the scanning unit S1 (S2) travels away from the main scanning plane of the other scanning unit S2 (S1). With this configuration, in the present embodiment, the undesirable light 9a (9b) which is generated by being reflected from a surface 25a1 (25b1) of the first imaging lens 25a (25b) is caused to travel in the direction away (distant) from the main scanning plane including the optical reference axis C0 of the opposed scanning unit S2 (S1). In this way, the undesirable light 9a (9b) generated by the first imaging lens 25a (25b) can be easily blocked by the light blocking members 12b (12a) provided in the second (first) scanning unit S2 (S1).

In this way, in the present embodiment, by shifting the optical axis H0 of the first imaging lens in the sub-scanning section as described above, undesirable light from an opposed scanning unit can be easily blocked by the light blocking unit. Therefore, in the present embodiment, the undesirable light can be blocked more easily than in Embodiment 1 described above. When the imaging lens of which the optical axis is shifted is an imaging lens having the greatest power in the sub-scanning direction among the plurality of imaging lenses of the imaging optical system Ma (Mb), more effective advantages can be obtained.

Color Image Forming Apparatus

Figure 4:
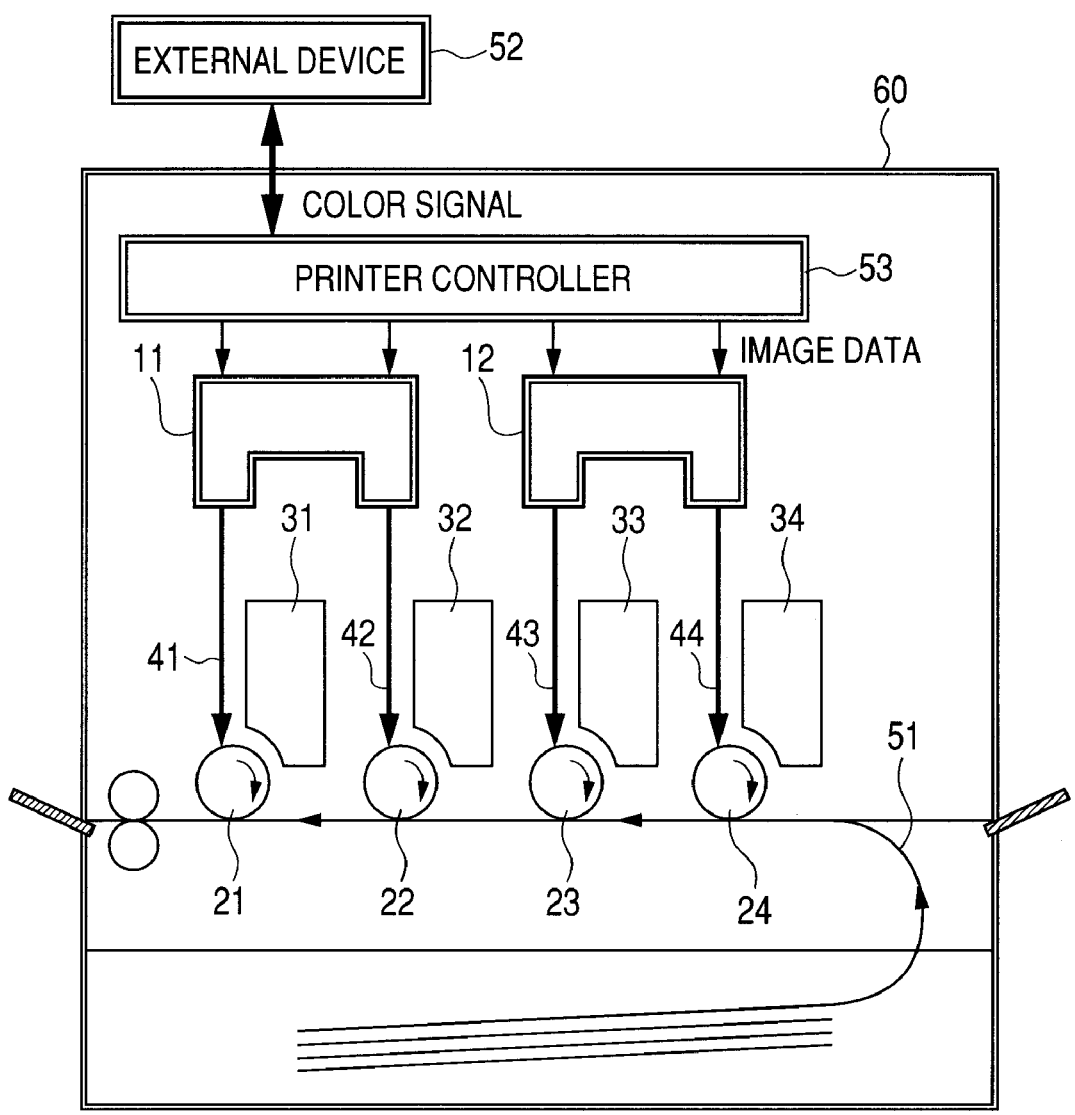
FIG. 4 is a schematic diagram of a main portion of a color image forming apparatus according to an embodiment of the present invention.

FIG. 4 is a schematic diagram of a main portion of a color image forming apparatus according to an embodiment of the present invention. The present embodiment relates to a tandem type color image forming apparatus in which two optical scanning apparatuses are arranged in parallel to each other so as to record image information on a photosensitive drum surface which is an image bearing member. In FIG. 4, a color image forming apparatus 60 includes optical scanning apparatuses 11 and 12 having the configuration described in any one of Embodiments 1 to 3, photosensitive drums 21, 22, 23, and 24 as image bearing members, developing devices 31, 32, 33, and 34, and a transferring belt 51.

In FIG. 4, respective color signals of red (R), green (G), and blue (B) are input from an external device 52 such as a personal computer to the color image forming apparatus 60. The color signals are converted into image data (dot data) of cyan (C), magenta (M), yellow (Y), and black (B) by a printer controller 53 in the color image forming apparatus. The image data are input to the optical scanning apparatuses 11 and 12. The optical scanning apparatuses 11 and 12 emit light beams 41, 42, 43, and 44 which are modulated according to the respective image data. The photosensitive surfaces of the photosensitive drums 21, 22, 23, and 24 are scanned with the light beams in the main scanning direction.

In the color image forming apparatus of the present embodiment, two optical scanning apparatuses 11 and 12 configured by two scanning units are arranged in parallel to each other. The respective light beams correspond to the respective colors of cyan (C), magenta (M), yellow (Y), and black (B) and are formed in parallel on the surfaces of the photosensitive drums 21, 22, 23, and 24 as image signals (image information), thereby printing a color image at a high speed. According to the color image forming apparatus of the present embodiment, as described above, latent images of the respective colors are formed on the corresponding surfaces of the photosensitive drums 21, 22, 23, and 24 using the light beams based on the respective image data by two scanning optical apparatuses 11 and 12 configured by two scanning units. After that, the images are superposedly transferred onto a recording medium, whereby a single full-color image is produced thereon. As the external device 52, a color image reading apparatus including a CCD sensor may be used. In this case, the color image reading apparatus and the color image forming apparatus 60 constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-123924, filed May 22, 2009, which is hereby incorporated by reference herein in its entirety.

What is claimed is:

1. An optical scanning apparatus comprising two scanning units, the two scanning units each including:

a light source unit;

an incident optical system that guides light beams emitted from the light source unit to a deflecting unit; and an imaging optical system that causes the light beams deflected for scanning by a deflecting surface of the deflecting unit to form an image on a surface to be scanned, wherein:

in a sub-scanning section, the two scanning units are arranged so as to oppose each other with the deflecting unit interposed therebetween;

in the sub-scanning section, the two scanning units are configured such that main scanning planes thereof including an optical reference axis have a different height from a bottom surface of the deflecting unit in the direction of a rotational axis of the deflecting unit;

the two scanning units each include a light blocking unit that prevents undesirable light generated by the other scanning unit from entering the corresponding scanning unit;

of at least one imaging optical element constituting the imaging optical system, an imaging optical element disposed optically closest to the deflecting unit is arranged such that an optical axis of the imaging optical element is made eccentric in the sub-scanning section so that undesirable light generated by the other scanning unit is caused to travel away from the main scanning plane including the optical reference axis of the corresponding scanning unit.

2. The optical scanning apparatus according to claim 1, wherein in the sub-scanning section, the two scanning units are configured such that the respective main scanning planes including the optical reference axis are parallel to each other with the deflecting unit interposed therebetween.

3. A color image forming apparatus including a plurality of image bearing members which are arranged on a surface to be scanned of the optical scanning apparatus according to claim 1 so as to form images of different colors.

4. An optical scanning apparatus comprising two scanning units, the two scanning units each including:

a light source unit;

an incident optical system that guides light beams emitted from the light source unit to a deflecting unit; and an imaging optical system that causes the light beams deflected for scanning by a deflecting surface of the deflecting unit to form an image on a surface to be scanned, wherein:

in a sub-scanning section, the two scanning units are arranged so as to oppose each other with the deflecting unit interposed therebetween;

in the sub-scanning section, the two scanning units are configured such that main scanning planes thereof including an optical reference axis have a different height from a bottom surface of the deflecting unit in the direction of a rotational axis of the deflecting unit;

the two scanning units each include a light blocking unit that prevents undesirable light generated by the other scanning unit from entering the corresponding scanning unit;

of at least one imaging optical element constituting the imaging optical system, an imaging optical element having the greatest power in the sub-scanning direction is arranged such that the imaging optical element is made eccentric in the sub-scanning section so that undesirable light generated by the other scanning unit is caused to travel away from the main scanning plane including the optical reference axis of the corresponding scanning unit.

5. The optical scanning apparatus according to claim 4, wherein in the sub-scanning section, the two scanning units are configured such that the respective main scanning planes including the optical reference axis are parallel to each other with the deflecting unit interposed therebetween.

6. A color image forming apparatus including a plurality of image bearing members which are arranged on a surface to be scanned of the optical scanning apparatus according to claim 4 so as to form images of different colors.

* * * * *